United States Patent
Fukuda et al.

(10) Patent No.: US 7,597,482 B2
(45) Date of Patent: Oct. 6, 2009

(54) SKEW CONTACT DOUBLE ROW BALL BEARING AND BEARING DEVICE FOR SUPPORTING PINION SHAFT

(75) Inventors: Toshirou Fukuda, Osaka (JP); Hiroyuki Ooshima, Osaka (JP)

(73) Assignee: JTEKT Corporation, Osaka (JP)

( * ) Notice: Subject to any disclaimer, the term of this patent is extended or adjusted under 35 U.S.C. 154(b) by 205 days.

(21) Appl. No.: 10/592,333

(22) PCT Filed: Mar. 10, 2005

(86) PCT No.: PCT/JP2005/004212

§ 371 (c)(1),
(2), (4) Date: Sep. 11, 2006

(87) PCT Pub. No.: WO2005/088144

PCT Pub. Date: Sep. 22, 2005

(65) Prior Publication Data

US 2007/0196037 A1    Aug. 23, 2007

(30) Foreign Application Priority Data

Mar. 11, 2004 (JP) ............................. 2004-068323

(51) Int. Cl.
*F16C 19/08* (2006.01)
*F16C 33/40* (2006.01)
*F16C 33/60* (2006.01)

(52) U.S. Cl. ...................................... 384/504; 384/512
(58) Field of Classification Search ......... 384/504–506, 384/512, 516, 519, 523, 526, 539, 544; 29/898.06
See application file for complete search history.

(56) References Cited

U.S. PATENT DOCUMENTS 1,325,113 A * 12/1919 Rohn ......................... 384/512

(Continued)

FOREIGN PATENT DOCUMENTS

JP    5-66327    9/1993

(Continued)

OTHER PUBLICATIONS

U.S. Appl. No. 10/494,152, filed Apr. 29, 2004, Bearing device for supporting pinion shaft.
U.S. Appl. No. 10/518,563, filed Dec. 20, 2004, Bearing apparatus for supporting pinon shaft.

*Primary Examiner*—Marcus Charles
(74) *Attorney, Agent, or Firm*—Jordan and Hamburg LLP

(57) ABSTRACT

A skew contact double row ball bearing and a bearing device for supporting a pinion shaft. The skew contact double row ball bearing enabling the simultaneous contact of a ball row in each row on raceways at a specified contact angle when installed even if a clearance amount is reduced by the fitting of the bearing by preventing the ball bearing from being substantially affected by a change in the assembled width of each row by the fitting of the bearing. The axially double row ball rows are interposed between the raceways of inner and outer rings and at pitch circle diameters different from each other and at contact angles different from each other so that the radial clearance of the ball row with the smaller contact angle is set larger than the radial clearance of the ball row with the larger contact angle.

5 Claims, 8 Drawing Sheets

U.S. PATENT DOCUMENTS

| | | | |
|---|---|---|---|
| 1,645,345 A | 10/1927 | Okner | |
| 2,103,912 A | 12/1937 | Montgomery | |
| 2,733,967 A | 2/1956 | Jones | |
| 3,792,625 A | 2/1974 | Asberg | |
| 4,699,527 A * | 10/1987 | Hutzel | 384/510 |
| 4,723,851 A * | 2/1988 | Troster et al. | 384/504 |
| 5,492,419 A | 2/1996 | Miller et al. | |
| 6,957,919 B2 * | 10/2005 | Kern et al. | 384/526 |
| 7,059,777 B2 * | 6/2006 | Kawaguchi et al. | 384/512 |
| 2004/0022469 A1 * | 2/2004 | Ozawa et al. | 384/544 |
| 2005/0220383 A1 * | 10/2005 | Yokota et al. | 384/523 |

FOREIGN PATENT DOCUMENTS

| | | |
|---|---|---|
| JP | 9-105450 | 4/1997 |
| JP | 10-9259 | 1/1998 |
| JP | 10-220468 | 8/1998 |
| JP | 2000-2239 | 1/2000 |
| JP | 2003-294033 | 10/2003 |
| JP | 2003-314541 | 11/2003 |
| WO | WO-00/12916 | 3/2000 |

* cited by examiner

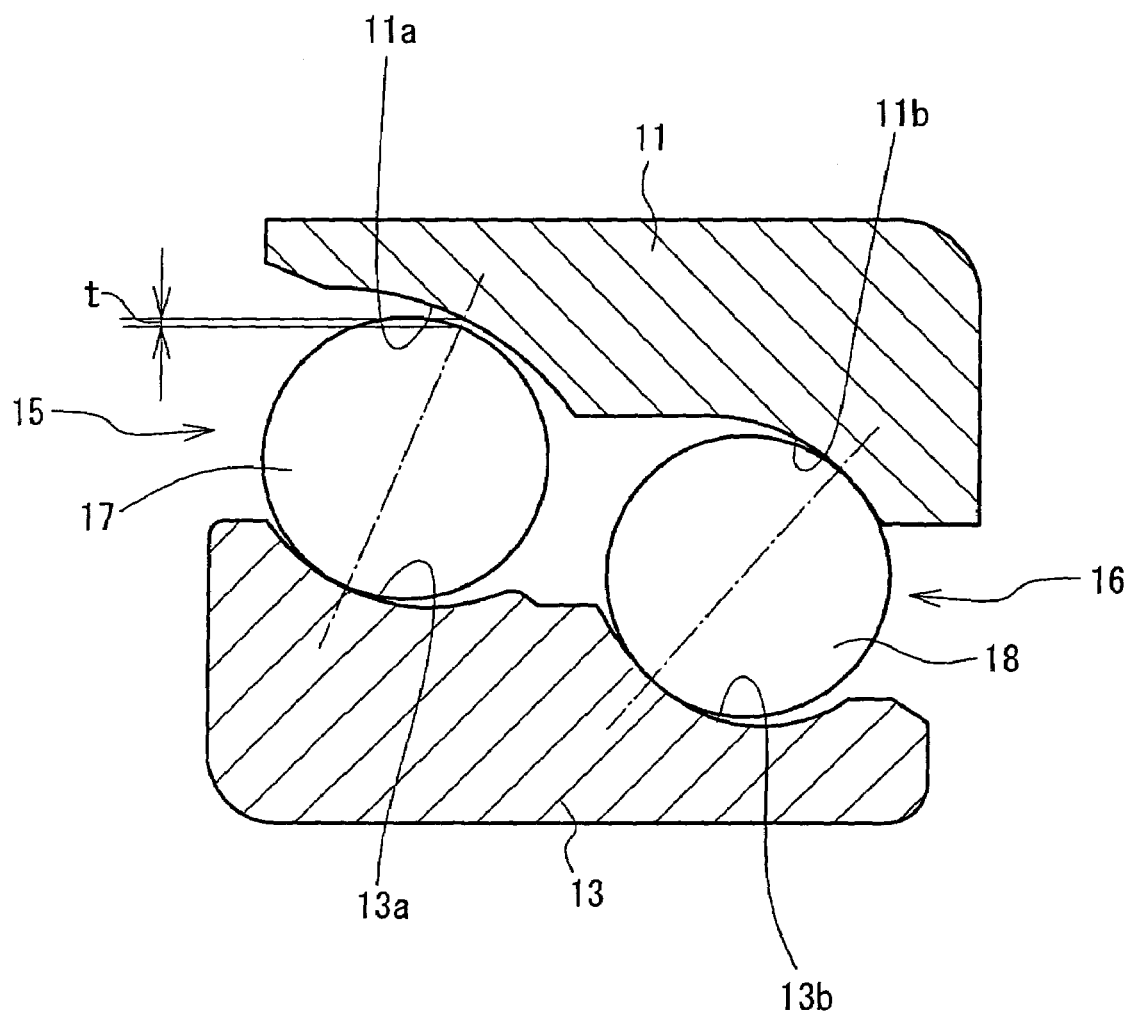
F I G. 1

F I G. 7
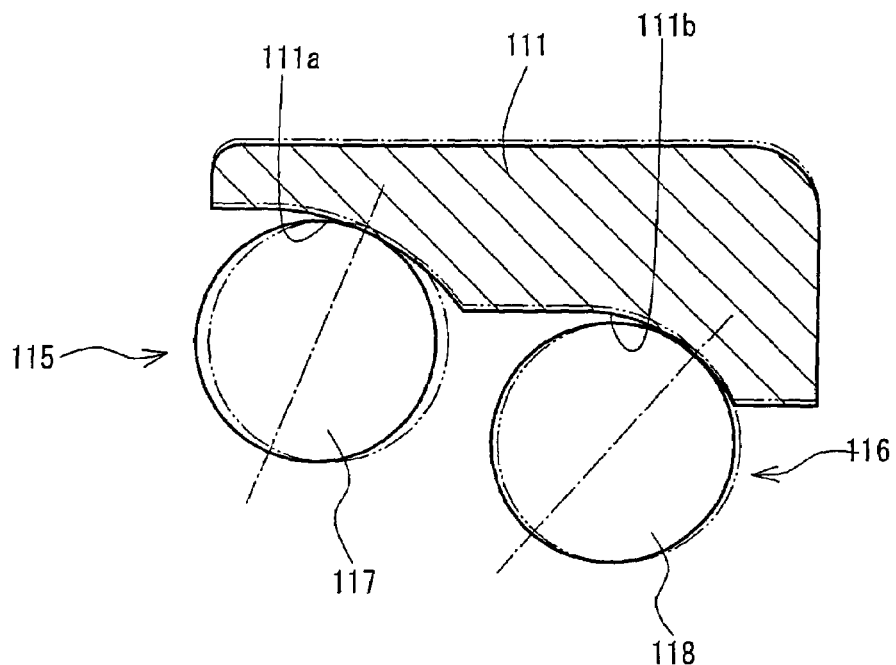
F I G. 8
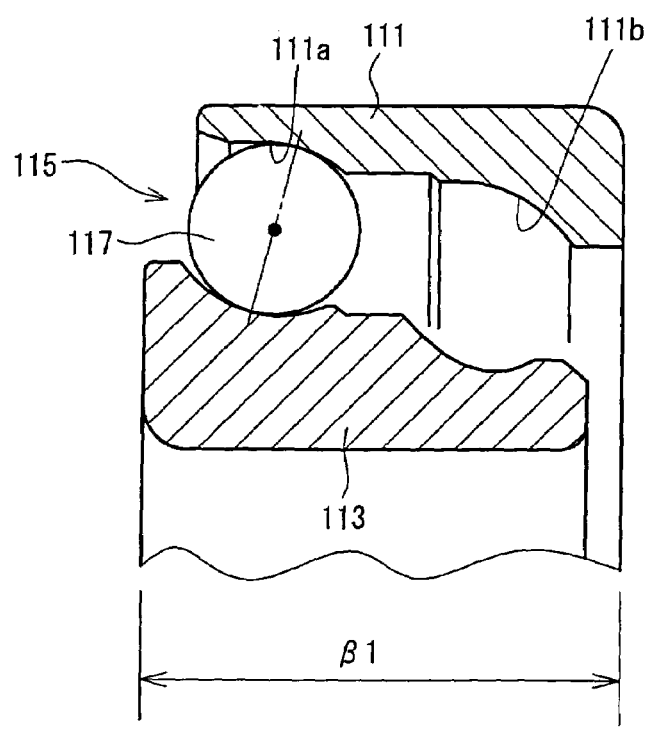

US 7,597,482 B2

SKEW CONTACT DOUBLE ROW BALL BEARING AND BEARING DEVICE FOR SUPPORTING PINION SHAFT

FIELD OF THE INVENTION

The present invention relates to an skew contact double row ball bearing optimally applied to a structure for rotatably supporting a pinion shaft incorporated in a differential device of an automobile, a transfer device for four-wheel drive, and the like, and a bearing device for supporting the pinion shaft in which the skew contact double row ball bearing is incorporated.

BACKGROUND OF THE INVENTION

As a conventional structure of a differential device of an automobile and a transfer device for four-wheel drive, a pinion shaft used in these devices is rotatably journaled via a skew contact double row ball bearing in which pitch circle diameters of double rows are different to each other, in other words, raceway diameters of the respective rows are different to each other. as is disclosed in Japanese laid-open patent application No. 2003-314541. The skew contact double row ball bearing of the foregoing type is called a tandem double row ball bearing.

The skew contact double row ball bearing incorporated in the differential device comprises, as shown in FIG. 6, an inner ring 113 having raceways 113a and 113b in double rows and externally fitted to a pinion shaft 107, an outer ring 111 having raceways 111a and 111b in double rows facing the raceways 113a and 113b of the inner ring 113 and internally fitted to a differential case 102, and double rows of balls 115 and 116 respectively interposed between the raceways 111a, 111b, 113a and 113b in the respective rows of the inner ring 113 and the outer ring 111. The double rows of balls 115 and 116 are respectively interposed between the raceways 111a, 111b, 113a and 113b with the different pitch circle diameters.

In the skew contact double row ball bearing, contact angles α1 and α2 of the respective rows may be different to each other, in which case, however, radial clearances of the respective rows in the skew contact double row ball bearing before the bearing is incorporated are equally set.

DISCLOSURE OF THE INVENTION

Problems to be Solved by the Invention

When the skew contact double row ball bearing is incorporated into the differential device, engagements among the bearing, pinion shaft 107 and differential case 102 reduce a clearance amount inside the bearing, however, assembled widths are differently variable in the respective rows because the contact angles α1 and α2 in the respective rows are different to each other. More specifically, as shown in FIG. 7, when the outer ring 111 radially moves (diameter of the outer ring is reduced radially inward when the bearing is fitted into the differential case) in a state where the outer ring 111 and the balls 117 and 118 of the respective rows 115 and 116 are in contact with each other, for example, the balls 117 and 118 of the respective rows, which are in contact with the raceways 111a and 111b of the outer ring 111, move in the left direction (axial direction), while a moving distance of the balls 117 on the smaller-contact-angle-α1 side is larger than a moving distance of the balls 118 on the larger-contact-angle-α2 side. The contact angles α1 and α2 of the respective rows in the skew contact double row ball bearing incorporated in the differential device are set to predetermined values in consideration of a balance in load capacities with respect to radial and axial loads and a balance in rolling lives in the respective rows.

It is assumed that dimensions between axial ends of the inner and outer rings 111 and 113 in a state where only the balls 115 on the smaller-contact-angle-α1 side are provided is set to an assembly width β1 as shown in FIG. 8, and that the dimensions between the axial ends of the inner and outer rings 111 and 113 in a state where only the balls 116 on the larger-contact-angle-α2 side are provided is set to an assembly width β2 as shown in FIG. 9. A changing amount of the assembled width β1 is larger than a changing amount of the assembled width β2 when the bearing, pinion shaft and differential case are engaged with one another (when the bearing is incorporated) because the axial moving distance of the balls 117 on the smaller-contact-angle-α1 side is larger than the axial moving distance of the balls 118 on the larger-contact-angle-α2 side.

Because the changing amounts of the assembled widths in the respective rows are thus different, when the skew contact double row ball bearing is incorporated, the balls 117 having the assembled width whose changing amount is larger (smaller-contact-angle-α1 side) abut the inner and outer rings 111a and 113a earlier than the balls 118 having the assembled width whose changing amount is smaller (larger-contact-angle-α2 side) as shown in FIG. 6. As a result, a large clearance is generated between the balls 118 having the assembled width whose changing amount is smaller (larger-contact-angle-α2 side) and the raceways 111b and 113b, which unfavorably leaves the balls 118 on the larger-contact-angle-α2 side in a partial-contact state. More specifically, the balls 118 no longer contact the inner and outer rings 111 and 113 in the case where the load applied to the tandem double row ball bearing is not sufficiently large. The generation of the partial contact reduces the bearing life.

A main object of the present invention is to substantially eliminate the influence caused by the changing assembled widths in the respective rows due to the engagement of the bearing to thereby make the balls in the respective rows simultaneously contact the raceways at predetermined angles when the bearing is incorporated even though the clearance amount is reduced due to the engagement.

Means for Solving the Problems

In an skew contact double row ball bearing according to the present invention, double rows of balls in an axial direction are interposed in raceways of inner and outer rings at different pitch circle diameters and different contact angles, and a radial clearance in the row of balls in which the contact angle is smaller is larger than a radial clearance in the row of balls in which the contact angle is larger.

According to the skew contact double row ball bearing of the present invention, the radial clearance in the row of balls in which a changing amount of an assembled width is large because of its smaller contact angle before the bearing is incorporated is set to a value larger than that of the radial clearance in the row of balls in which the changing amount of the assembled width is small because of its larger contact angle. Therefore, the balls in the respective rows and raceways of inner and outer rings can simultaneously contact with one another at the predetermined contact angles because of engagements between the inner and outer rings of the bearing and member to which the inner and outer rings are fitted (for example, pinion shaft and housing) even though a clearance amount in the engagements is reduced. The radial clearance recited in the present invention is calculated from a radial shift amount (distance) between a position of the raceway contacting the balls at the predetermined angle and a position of the raceway actually contacting the balls. In the case where the shift amount is generated on the outer-ring side and the inner-ring side both, the radial clearance is calculated in consideration of the shift amounts on the both sides.

Further, the pitch circle diameter of the row of balls on the smaller-contact-angle side is preferably larger than the pitch circle diameter of the row of balls on the larger-contact-angle side. The contact angles of the two rows of balls preferably have a same direction. The skew contact double row ball bearing can be optimally applied to a bearing device for supporting a pinion shaft.

Effect of the Invention

According to the present invention, the radial clearances in the respective rows before the bearing is incorporated are controlled to be different to each other. Therefore, such a disadvantage as the partial contact can be avoided, and a life of the bearing can be thereby improved.

BRIEF DESCRIPTION OF THE DRAWINGS

FIG. 1 is a sectional view of a main part illustrating a difference in radial clearances of an skew contact double row ball bearing according to a preferred embodiment of the present invention.

FIG. 7 is a schematic sectional view illustrating moving amounts of balls in the conventional skew double row ball bearing.

FIG. 8 is a sectional view illustrating a first state of an assembled width in the conventional skew double row ball bearing.

DESCRIPTION OF REFERENCE SYMBOLS 11 outer ring
11a raceway (large diameter outer ring raceway)
11b raceway (small diameter outer ring raceway)
13 inner ring
13a raceway (large diameter inner ring raceway)
13b raceway (large diameter inner ring raceway)
15 row of balls
16 row of balls
D1 pitch circle-diameter
D2 pitch circle diameter
α1 contact angle
α2 contact angle

PREFERRED EMBODIMENT OF THE PRESENT INVENTION

Figure 2:
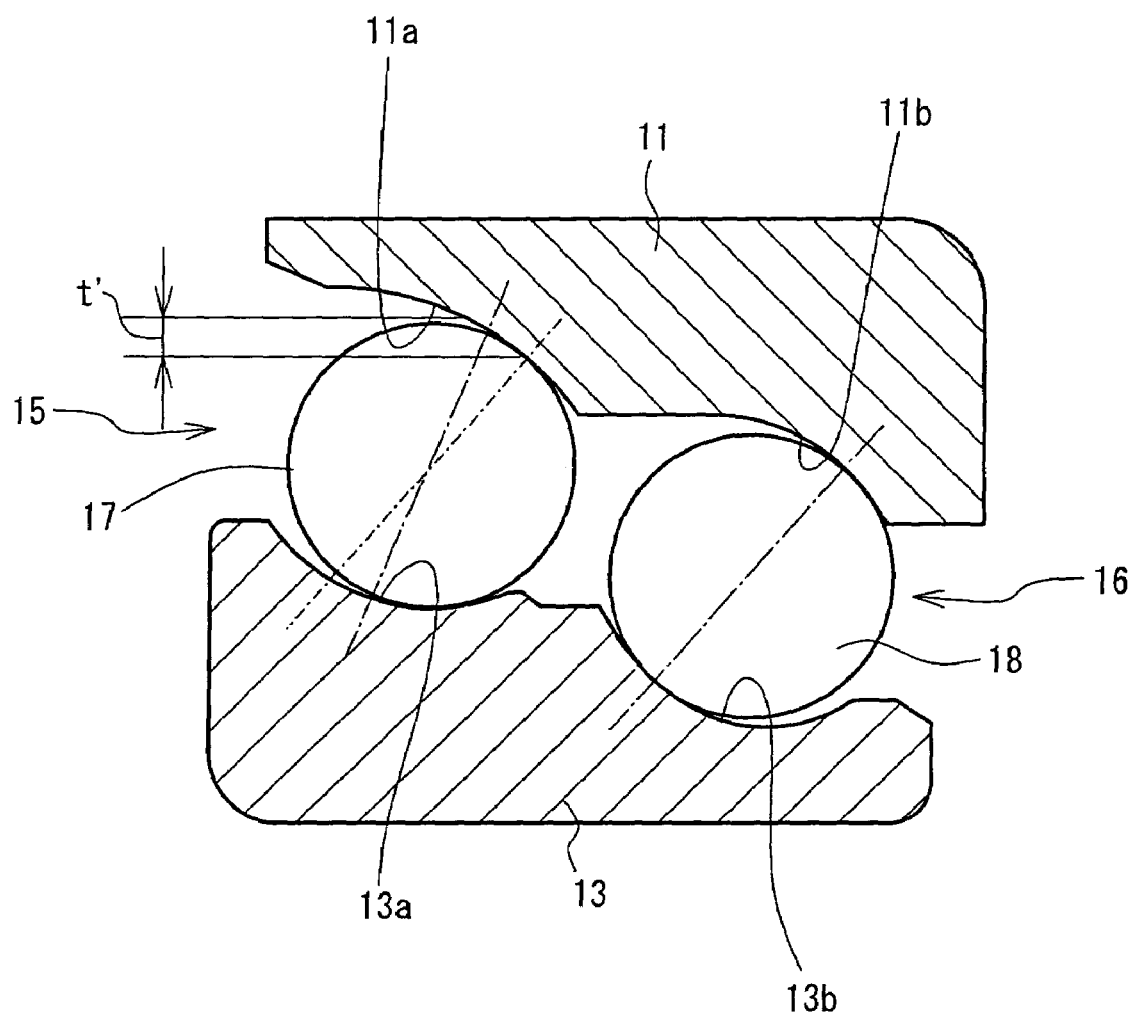
FIG. 2 is a sectional view of a main part illustrating a difference in the radial clearance of the skew contact double row ball bearing according to the preferred embodiment of the present invention.
Figure 3:
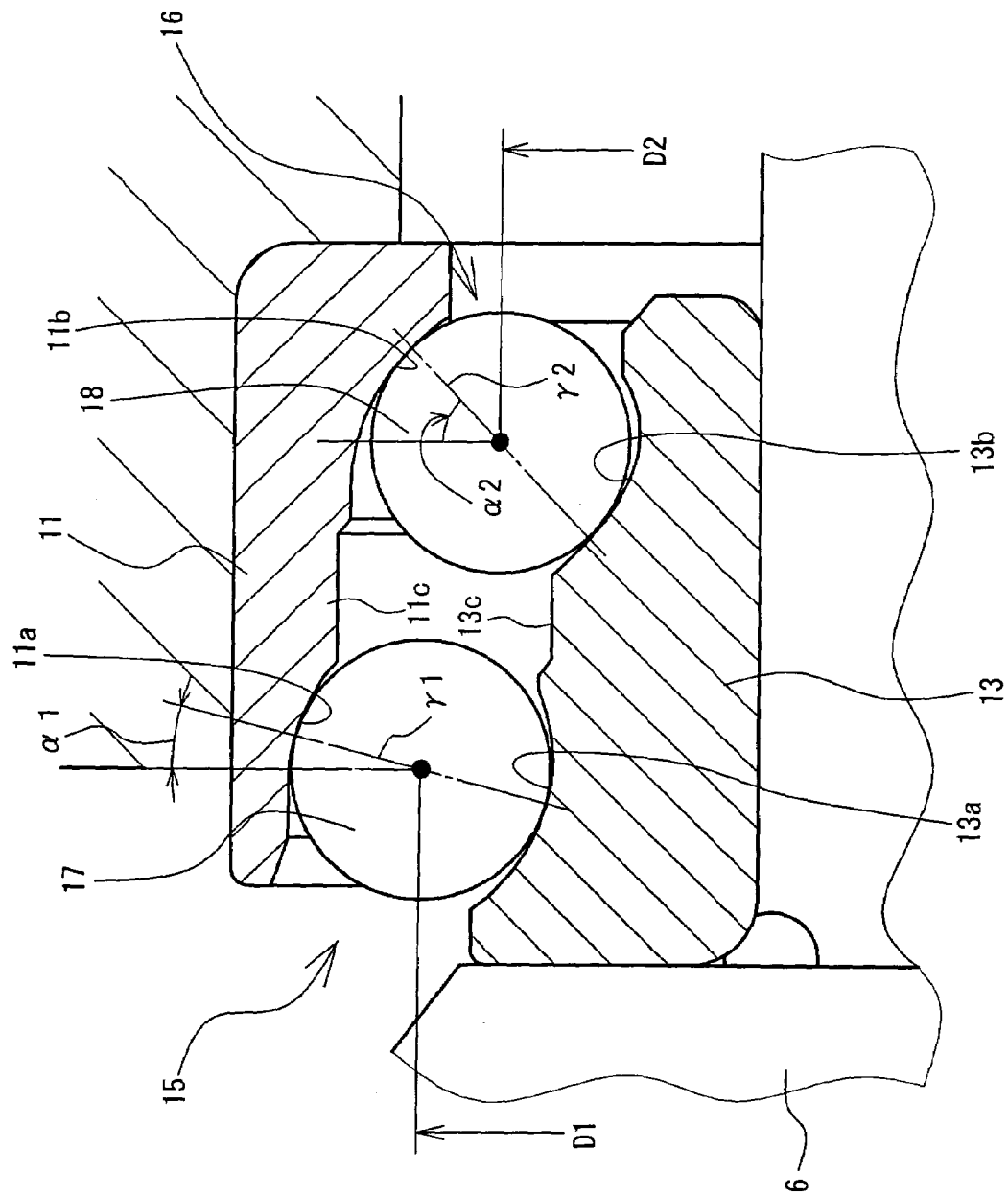
FIG. 3 is an enlarged sectional view of the bearing.
Figure 4:
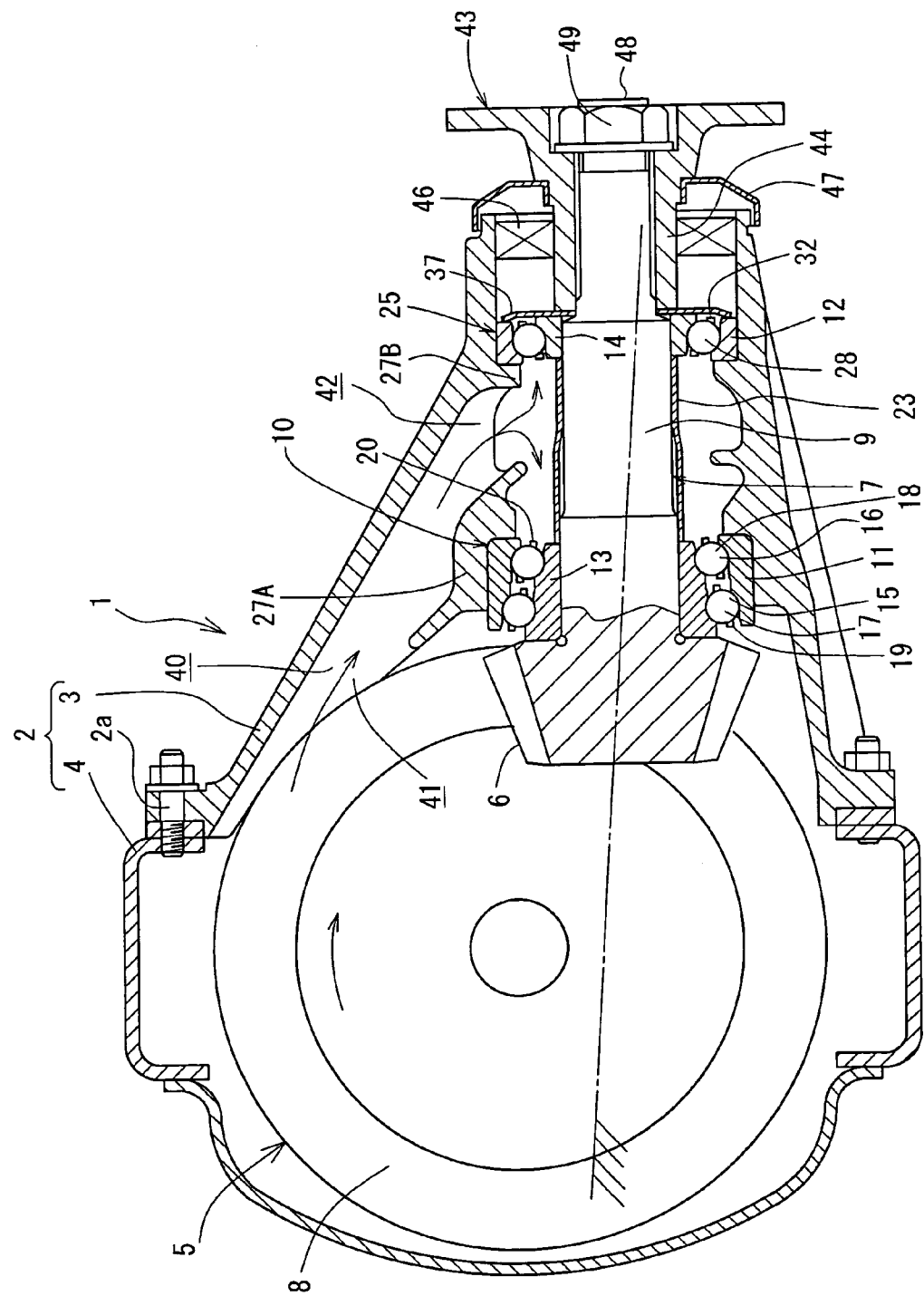
FIG. 4 is a sectional view of an entire structure of a differential device in which the present preferred embodiment is incorporated.
Figure 5:
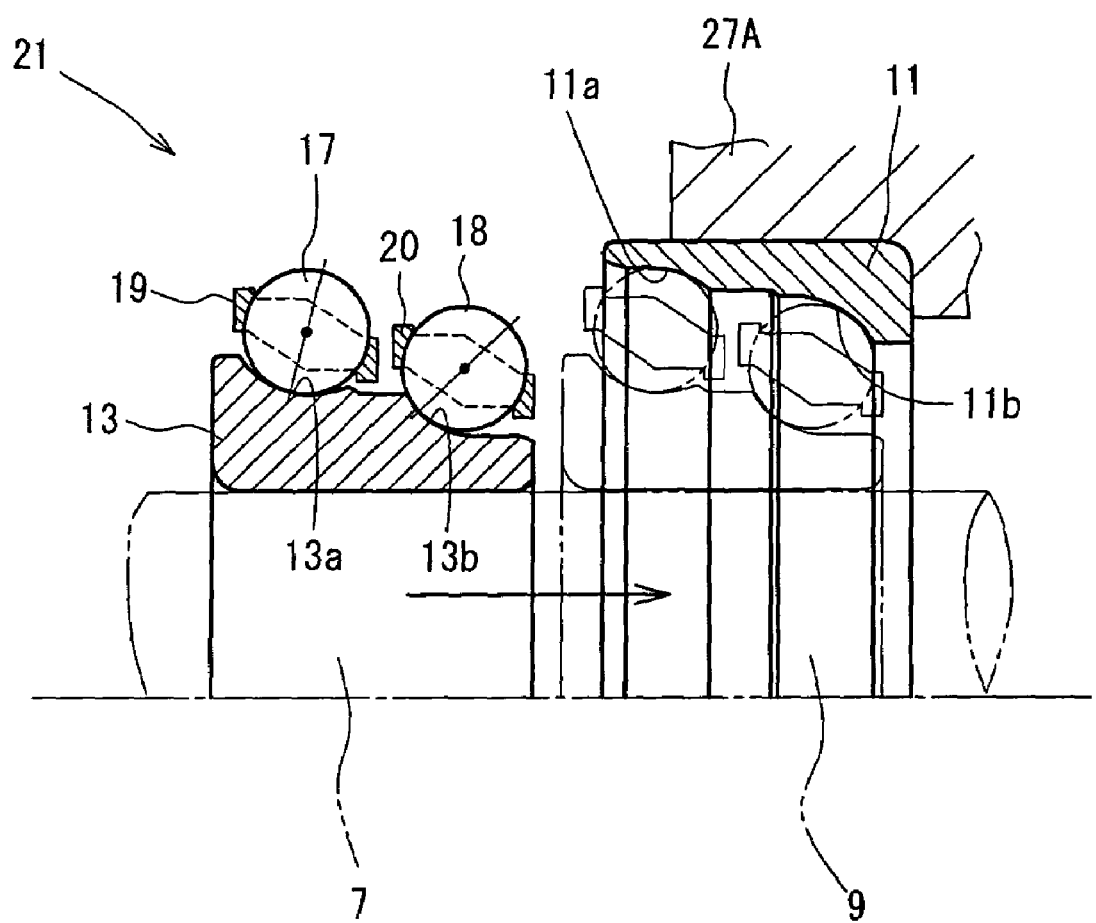
FIG. 5 is a sectional view illustrating an intermediate state in the process of incorporating the skew contact double row ball bearing into the differential device.
Figure 6:
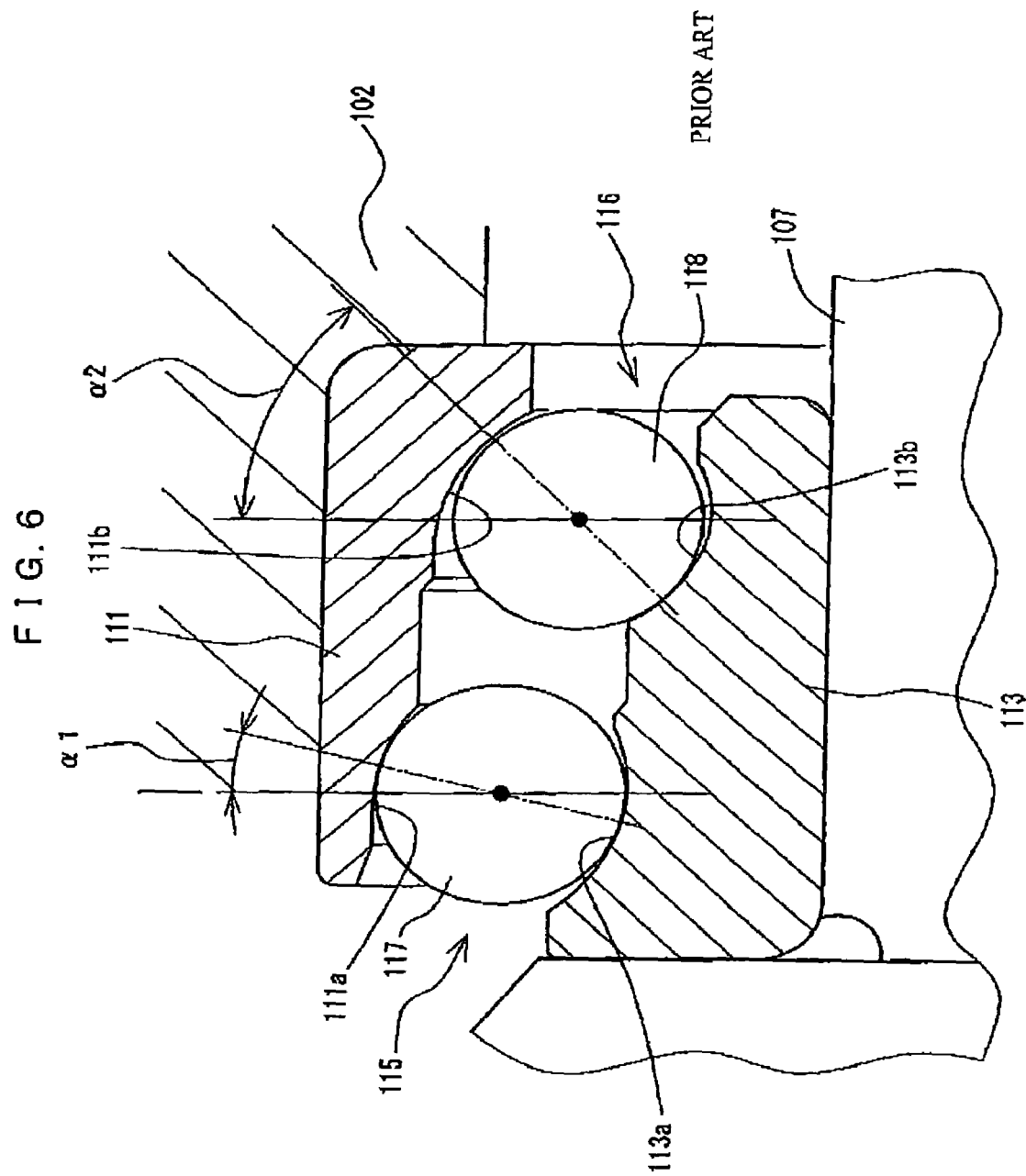
FIG. 6 is an enlarged sectional view of a conventional skew double row ball bearing.
Figure 9:
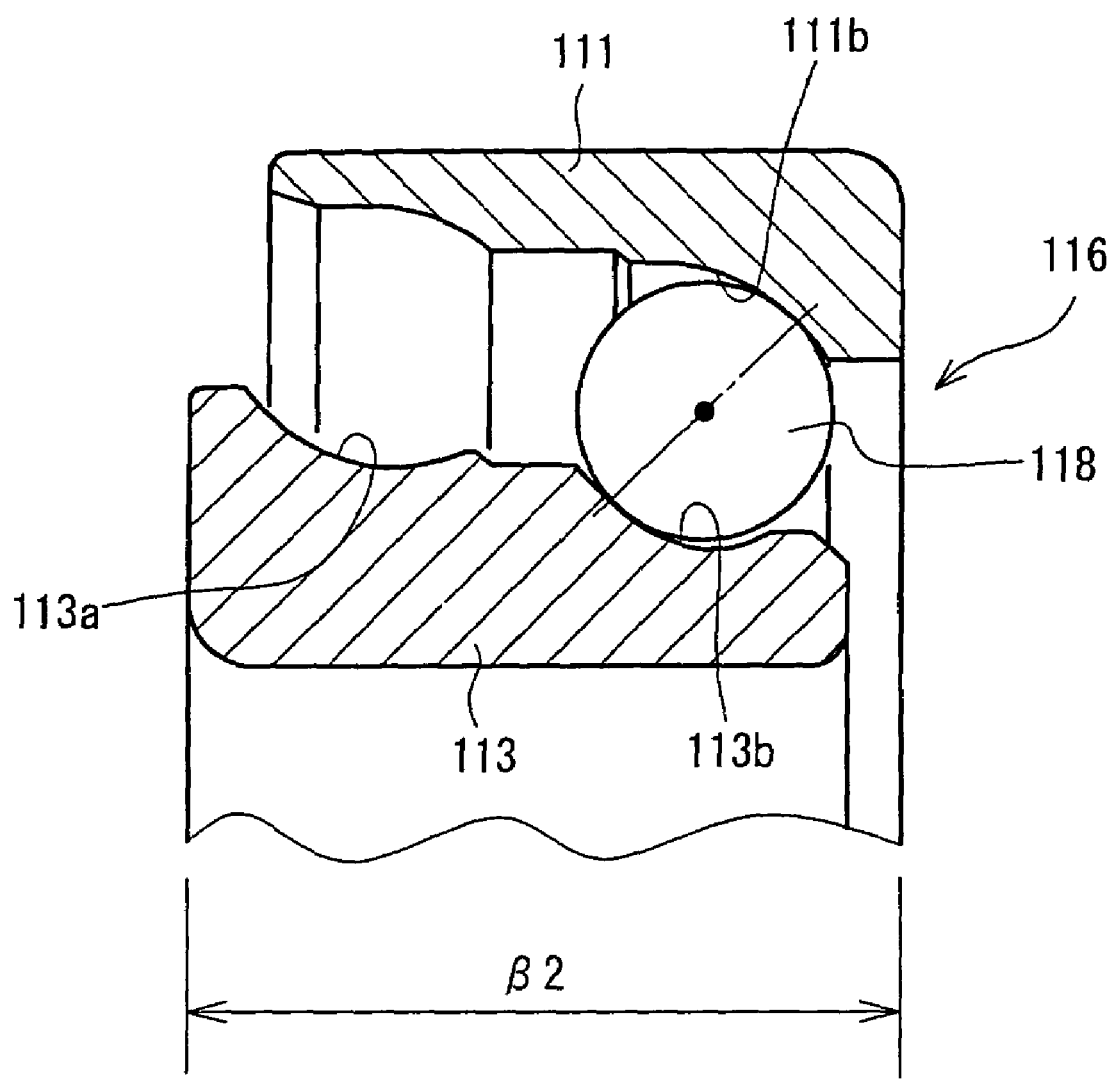
FIG. 9 is a sectional view illustrating a first state of the assembled width in the conventional skew double row ball bearing.

Referring to FIGS. 1-5 is described a preferred embodiment wherein an skew contact double row ball bearing according to the present invention is applied to a bearing device for supporting a pinion shaft of a differential device installed in a vehicle. FIGS. 1 and 2 are each a sectional view of a main part illustrating a difference in radial clearances in the skew contact double row ball bearing according to the preferred embodiment. FIG. 3 is an enlarged sectional view of the skew contact double row ball bearing. FIG. 4 is a sectional view of an entire structure of the differential device. FIG. 5 is a sectional view illustrating an intermediate state in the process of incorporating the skew contact double row ball bearing according to the preferred embodiment.

As shown in FIG. 4, a differential device 1 comprises a differential case 2. The differential case 2 comprises a front case 3 and a rear case 4. The cases 3 and 4 are coupled with each other via a bolt and a nut 2a and function as a housing member. The differential case 2 is provided with a differential speed-change mechanism 5 for differentially and interlockingly rotating right and left wheels and a pinion shaft 7. The differential speed-change mechanism 5 comprises a ring gear 8. A pinion gear 6 engaged with a pinion shaft 7 is provided on one side of the pinion shaft 7.

A shaft part 9 of the pinion shaft 7 is rotatably supported with respect to the front case 3 via a double row ball bearing 10 and a single row ball bearing 25. An skew contact double row skew ball bearing constitutes the double row ball bearing 10, which supports the pinion-gear-6 side of the shaft part 9 of the pinion shaft 7. An skew contact ball bearing constitutes the single row ball bearing 25, which journals the counter-pinion-gear side of the shaft part 9.

The double row ball bearing 10 comprises a single outer ring 11 internally fitted to an annular wall 27A formed in the front case 3, a single inner ring 13 externally fitted to the shaft part 9 of the pinion shaft 7, double rows of balls 15 and 16 interposed between the outer ring 11 and the inner ring 13, and retainers 19 and 20 for retaining balls 17 and 18 constituting the respective rows of balls 15 and 16 at circumferentially equal intervals.

A tandem double row ball bearing, in which pitch circle diameters of the double rows are different to each other, in other words, raceway diameters of the respective rows are different to each other, constitutes the double row ball bearing 10. More specifically, in the double row ball bearing 10, pitch circle diameters D1 and D2 of the respective rows of balls 15 and 16 are different to each other as shown in FIG. 3. More specifically, the pitch circle diameter D1 of the row of balls 15 provided on the pinion-gear side in an axial direction of the pinion shaft 7 is set to a value larger than that of the pitch circle diameter D2 of the row of balls 16 provided on the counter-pinion-gear side in the axial direction of the pinion shaft 7 (D1>D2). A diameter of the ball 17 of the row of balls 15 on a large-diameter side and a diameter of the ball 18 of the row of balls 16 on a small-diameter side are equal to each other.

The outer ring 11 comprises a large diameter outer ring raceway 11a on the pinion-gear side and a small-diameter outer ring raceway 11b on the counter-pinion-gear side. A planar part 11c having a diameter larger than that of the small diameter outer ring raceway 11b and continuous to the large diameter outer ring raceway 11a is formed between the large diameter outer ring raceway 11a and the small diameter outer ring raceway 11b. An inner peripheral surface of the outer ring 11 is thus formed in a step shape.

The inner ring 13 is a counterbored inner ring. More specifically, the inner ring 13 comprises a large diameter inner ring raceway 13a radially facing the large diameter outer ring raceway 11a and a small diameter inner ring raceway 13b radially facing the small diameter outer ring raceway 11b.

The inner ring 13 further comprises a planar part 13c having a diameter larger than that of the small diameter inner ring raceway 13b and continuous to the large diameter inner ring raceway 13a between the large diameter inner ring raceway 13a and the small diameter inner ring raceway 13b. An outer peripheral surface of the inner ring 13 is thus formed in the step shape In the double row ball bearing 10, the contact angle α1 of the row of balls 15 and the contact angle α2 of the row of balls 16 have a same direction. In other words, a line of action γ1 in accordance with the contact angle α1 of the row of balls 15 and a line of action γ2 in accordance with the contact angle α2 of the row of balls 16 face each other in a such a direction that an angle θ1 (not shown) made by the lines of action γ1 and γ2 is 0° or an acute angle (0°≦θ1<90°). Such a constitution is adopted so that a preload is imparted to the both rows of balls 15 and 16 in a same direction (direction from the pinion-gear side toward the counter-pinion-gear side in the axial direction). Further, the lines of action γ1 and γ2 are tilted in such a direction that outer-diameter sides thereof are on the counter-pinion-gear side and inner-diameter sides thereof are on the pinion-gear side with respect to a thrust surface. To be brief, the lines of action γ1 and γ2 are tilted in the upper-right direction in FIG. 3. The retainers 19 and 20 retain the balls 17 and 18 respectively constituting the rows of balls 15 and 16 at circumferentially equal intervals. Further, a relationship between the contact angle α1 and the contact angle α2 is contact angle α1<contact angle α2. The inner and outer rings 13 and 11 are formed so that the relationship is obtained between the contact angles α1 and α2, and then, the clearances are controlled. The present preferred embodiment is particularly characterized in that the contact angle α1 is thus smaller than the contact angle α2.

Before the double row ball bearing 10 is incorporated into the differential device, the inner and outer rings 13 and 11 are formed so that the radial clearance between the row of balls 15 on the large-diameter side (contact-angle-α1 side) and the large diameter inner and outer ring raceways 11a and 13a is larger than the radial clearance between the row of balls 16 on the small-diameter side (contact-angle-α2 side) and the small diameter inner and outer ring raceways 11b and 13b. More specifically, as shown in FIG. 1, provided that the row of balls 15 on the large-diameter side is at such a position that makes a contact at a predetermined angle $α_1$ in a state where the small diameter outer ring raceway 11b contacts the balls 18 of the row of balls 16 on the small-diameter side at a predetermined contact angle, a radial clearance t is generated between the large diameter outer ring raceway 11a and the balls 17 of the row of balls 15 on the large-diameter side. Further, as shown in FIG. 2, a position at which the large diameter outer ring raceway 11a and the balls 17 of the row of balls 15 on the large-diameter side contact each other in the state where the small diameter outer ring raceway 11b contacts the balls 18 of the row of balls 16 on the small-diameter side at the predetermined contact angle is shifted by a shift amount t' in comparison to a position at which the large diameter outer ring raceway 11a on the large-diameter side contacts the balls 15 at the predetermined angle.

The balls 17 and 18 of the respective rows are in contact with the large diameter inner ring raceway 13a and the small diameter inner ring raceway 13b of the inner ring 13. In other words, the radial clearance in one of the rows (large-diameter side) is set to a value larger by the dimension t than the radial clearance in the other row (small-diameter side). As described later, a value of the dimension t is appropriately set so that the balls 17 and 18 in the two rows provided in the inner ring 13 simultaneously contact the raceways 11a and 11b of the outer ring 11 fixed to the front case 3 at the predetermined contact angles when the double row ball bearing 10 is attached.

The single row ball bearing 25 is a single row skew ball bearing, and comprises an outer ring 12, an inner ring 14, a row of balls 28 and a retainer 32. The outer ring 12 is internally fitted to an annular wall 27B formed in the front case 3 and comprises an outer ring raceway. The inner ring 14 comprises an inner ring raceway radially facing the outer ring raceway of the outer ring 12. The row of balls 28 is provided between the inner and outer ring raceways. The retainer 32 retains balls constituting the row of balls 28 at circumferentially equal intervals.

An oil circulating path 40 is formed between an outer wall of the front case 3 and the annular wall 27A. An oil inlet 41 of the oil circulating path 40 is opened toward a ring-gear-8 side of the oil circulating path 40, while an oil outlet 42 of the oil circulating path 40 is opened toward between the annular walls 27A and 27B.

Next, a method of assembling the differential device 1 according to the present preferred embodiment is described. Before the differential device 1 is assembled, the double row ball bearing 10 is formed and the clearances inside the bearing are controlled so that the relationship that the radial clearance on the large-diameter side is larger than the radial clearance on the small-diameter side is satisfied.

After the clearances are thus controlled, in a state where the front case 3 and the rear case 4 are separated from each other, the outer ring 11 of the double row ball bearing 10 is pressure-inserted until it reaches a predetermined position of the annular wall 27A from a large-diameter opening of the front case 3 (opening coupled with the rear case 4). The pressure insertion is realized in such a manner that the raceways on the front side of the pressure insertion, that is the opinion-gear side (large-diameter-opening side of the front case 3), are the large diameter inner and outer ring raceways 11a and 13a, and the raceways provided on the rear side of the pressure insertion, that is the counter-pinion-gear side, are the small diameter inner and outer ring raceways 11b and 13b in the double row ball bearing 10.

At the time of the pressure insertion, the diameter of the outer ring 11 is slightly reduced radially inward by the engagement between the outer ring 11 and the annular wall 27A. More specifically, the inner diameters of the large diameter outer ring raceway 11a and the small diameter outer ring raceway 11b in the outer ring 11 are reduced, and the engagement between the outer ring 11 and the annular wall 27A accordingly reduces the clearance amount.

The inner ring 13 is externally fitted to the pinion shaft 7, and an assembly product 21 comprising the inner ring 13, rows of balls 15 and 16 and retainers 19 and 20 is provided on the pinion-gear side of the shaft part 9 of the pinion shaft 7. Because the inner ring 13 is externally fitted to the pinion shaft 7, the engagement between the outer ring 11 and the pinion shaft 7 reduces the clearance amount.

The pinion shaft 7 to which the assembly product 21 is attached is inserted from the small-diameter side thereof into the large-diameter opening of the front case 3 (opening coupled with the rear case 4) (see FIG. 5). At the time, the clearances in the bearing are controlled as described earlier, in other words, the relationship that the radial clearance on the large-diameter side is larger than the radial clearance on the small-diameter side is satisfied. Therefore, the balls 17 and 18 of the two rows of balls 15 and 16 simultaneously contact the large diameter outer ring raceway 11a and the small diameter outer ring raceway 11b of the outer ring 11 at the predetermined contact angles.

Further, the outer ring 12 of the single row ball bearing 25 is pressed into the annular wall 27B from a small-diameter opening of the front case 3 (opening which protrudes the pinion shaft 7 outside from inside of the front case 3). Next, a plastic spacer 23 is externally fitted to the shaft part 9 of the pinion shaft 7 from the small-diameter opening of the front case 3. Thereafter, the assembly product comprising the inner ring 14, row of balls 28 and retainer 32 of the single row ball bearing 25 is externally fitted to the shaft part 9 of the pinion shaft 7.

Then, a masking shield 37 is externally fitted to the shaft part 9 of the pinion shaft 7 from the small-diameter opening of the front case 3. A barrel part 44 of a companion flange 43 is spline-fitted to the shaft part 9 so that an end surface of the barrel part 44 abuts the masking shield 37. Further, an oil seal 46 is provided, and a seal protective cap 47 is attached to the small-diameter opening of the front case 3. After that, a nut 49 is screwed into a screw part 48 of the shaft part 9 so that a predetermined preload is applied to the double row ball bearing 10 and the single row ball bearing 25. More specifically, the nut 49 is screwed into the screw part 48 so that the inner ring 13 of the double row ball bearing 10 and the inner ring 14 of the single row ball bearing 25 are axially sandwiched between the pinion gear 6 and the companion flange 43. Thereby, the predetermined preload is applied to the balls 17 and 18 of the double row ball bearing 10 in the state where the balls 17 and 18 simultaneously contact the respective raceways of the inner and outer rings 11 and 13. The preload is also applied to the single row ball bearing 25.

According to the foregoing constitution, the preload is applied to the double row ball bearing 10 and the single row ball bearing 25. At the time, the load can be equally borne by the rows of balls 15 and 16 in the double row ball bearing 10, which improves the system life of the entire double row ball bearing 10.

The present invention is not limited to the foregoing preferred embodiment. For example, the bearing on the counter-pinion-gear side is not necessarily limited to the single row skew ball bearing 25, and a tandem double row skew ball bearing in which the pitch circle diameter of the row of balls on the counter-pinion-gear side is set to a value larger than that of the pitch circle diameter of the row of balls on the pinion-gear side may be alternatively used. In such a case, the double row skew ball bearing in which the radial clearance is controlled in each row, which was described earlier, can be adopted. The bearing on the counter-pinion-gear side may be a tapered roller bearing.

What is claimed is:

1. A skew contact double row ball bearing installed in an apparatus, comprising:
an inner ring having first and second inner ring raceways;
an outer ring having first and second outer ring raceways;
first and second rows of balls spaced axially apart and interposed respectively between said first inner and outer ring raceways and said second inner and outer ring raceway of inner and outer rings;
said first and second rows of balls being disposed at different pitch circle diameters and different contact angles from each other; and
said inner and outer rings in a predefined orientation relative each other in an uninstalled state defining a first radial clearance in one of the first and second rows of balls in which the contact angle is smaller and a second radial clearance in another one of said first and second rows of balls in which the contact angle is larger, said inner and outer rings in a predefined installed orientation relative each other as installed in said apparatus defining the contact angles of said first and second rows of balls, and said first radial clearance being larger than said second radial clearance.

2. The skew contact double row ball bearing as claimed in claim 1, wherein the pitch circle diameter of said one of the first and second rows of balls in which the contact angle is smaller is larger than the pitch circle diameter of said another one of the first and second rows of balls in which the contact angel is larger.

3. The skew contact double row ball bearing as claimed in claim 1, wherein the contact angles in the respective rows of balls have a same direction.

4. A bearing device for supporting a pinion shaft wherein both ends of the pinion shaft are supported by bearings, and at least one of the bearings is the skew contact double row ball bearing recited in any of claims 1 through 3.

5. A skew contact double row ball bearing installed in a housing, comprising:
an outer ring having dual raceways;
an inner ring having dual raceways;
axially spaced double rows of balls interposed between the raceways of inner ring and the raceways of the outer ring, the rows of balls being at pitch circle diameters different to each other; and
the row of balls having contact angles, defined when in a state where the bearing is installed on the housing, that differ from one another;
wherein, when the bearing is in an uninstalled state, and the raceways of the inner ring respectively contact corresponding ones of the rows of balls, a radial gap exists between the balls in the ball row with a smaller one of the contact angles and the corresponding raceway of the outer ring raceway, and the balls in the ball row with a larger contact angle contact the corresponding raceway of the outer ring.

* * * * *